US011310668B2

(12) United States Patent
Boutant et al.

(10) Patent No.: US 11,310,668 B2
(45) Date of Patent: Apr. 19, 2022

(54) METHOD FOR DIGITAL MESSAGING ASSOCIATING A MESSAGE WITH A MATERIAL SUBJECT

(71) Applicant: KERQUEST, Chindrieux (FR)

(72) Inventors: Yann Boutant, Chindrieux (FR); Gaël Rosset, Chindrieux (FR); Aurélien Hazebrouck, Chambery (FR)

(73) Assignee: KERQUEST, Chindrieux (FR)

( * ) Notice: Subject to any disclaimer, the term of this patent is extended or adjusted under 35 U.S.C. 154(b) by 129 days.

(21) Appl. No.: 16/493,995

(22) PCT Filed: Mar. 14, 2018

(86) PCT No.: PCT/FR2018/050616
§ 371 (c)(1),
(2) Date: Sep. 13, 2019

(87) PCT Pub. No.: WO2018/167431
PCT Pub. Date: Sep. 20, 2018

(65) Prior Publication Data
US 2021/0127274 A1  Apr. 29, 2021

(30) Foreign Application Priority Data

Mar. 14, 2017 (FR) ...................................... 1752087
Nov. 3, 2017 (FR) ...................................... 1760343

(51) Int. Cl.
*H04W 12/63* (2021.01)
*H04W 12/06* (2021.01)
(52) U.S. Cl.
CPC ........... *H04W 12/63* (2021.01); *H04W 12/06* (2013.01)
(58) Field of Classification Search
CPC ..... H04W 12/63; H04W 12/08; H04W 12/06; H04L 63/107; H04L 63/0853;
(Continued)

(56) References Cited

U.S. PATENT DOCUMENTS

| 5,982,932 A | * | 11/1999 | Prokoski | ............... G06F 17/153 382/224 |
| 8,099,598 B1 | * | 1/2012 | Liu | ........................ H04L 9/006 713/170 |

(Continued)

FOREIGN PATENT DOCUMENTS

| EP | 2 573 986 | 3/2013 |
| WO | WO 2016/128196 | 8/2016 |

OTHER PUBLICATIONS

International Search Report, PCT/FR2018/050616, dated Jun. 18, 2018.

*Primary Examiner* — Tongoc Tran
(74) *Attorney, Agent, or Firm* — Nixon & Vanderhye

(57) ABSTRACT

The invention proposes a system and a method for transmitting a message that allows a sender (designated by an identifier) to send a digital content to one or more recipients (designated by one or more identifiers), the content being associated with at least one material subject (each designated by a single authenticator). Thus, to send a message, the sender implements at least one single authenticator of the material subject, discriminant and intrinsic characteristic of each material subject, which serves to anchor the content to transmit. To be able to access the content of the message, the recipient must provide the server not only its identifier, as for any current messaging system, but also a single authenticator with a same material subject that was used at the time the sender created the message. A single authenticator of a material subject may be one or more image(s) of the authentication region of the material subject or any metrics taken from said image(s) and partly characterizing the microstructure of the material subject.

20 Claims, 1 Drawing Sheet

(58) Field of Classification Search
CPC ......... H04L 51/12; H04L 51/20; H04L 51/10; H04L 63/123; G06K 9/6202; G06T 7/004
See application file for complete search history.

(56) References Cited

U.S. PATENT DOCUMENTS

| | | | | |
|---|---|---|---|---|
| 8,838,071 B1* | 9/2014 | Cronin | ................... | H04L 63/10 455/411 |
| 9,710,691 B1* | 7/2017 | Hatcher | ............. | G06K 9/00093 |
| 10,715,519 B1* | 7/2020 | Slaby | ..................... | H04W 12/06 |
| 2005/0100219 A1* | 5/2005 | Berkner | .............. | G06F 16/5838 382/190 |
| 2009/0060348 A1* | 3/2009 | Monro | ............... | G06K 9/00617 382/209 |
| 2010/0211997 A1* | 8/2010 | McGeehan | ......... | H04L 63/1483 726/4 |
| 2011/0273728 A1* | 11/2011 | Sasaki | .................. | G06K 15/005 358/1.2 |
| 2012/0036071 A1* | 2/2012 | Fulton | ................ | G06Q 20/4016 705/44 |
| 2012/0124664 A1* | 5/2012 | Stein | ....................... | H04L 51/12 726/22 |
| 2013/0067547 A1* | 3/2013 | Thavasi | .................. | G06F 21/31 726/7 |
| 2013/0074194 A1* | 3/2013 | White | .................... | H04L 51/00 726/28 |
| 2013/0074195 A1* | 3/2013 | Johnston | ................ | H04L 63/08 726/28 |
| 2016/0248784 A1 | 8/2016 | Kimura et al. | | |
| 2016/0267353 A1* | 9/2016 | Kwak | ................. | G06K 9/00744 |

* cited by examiner

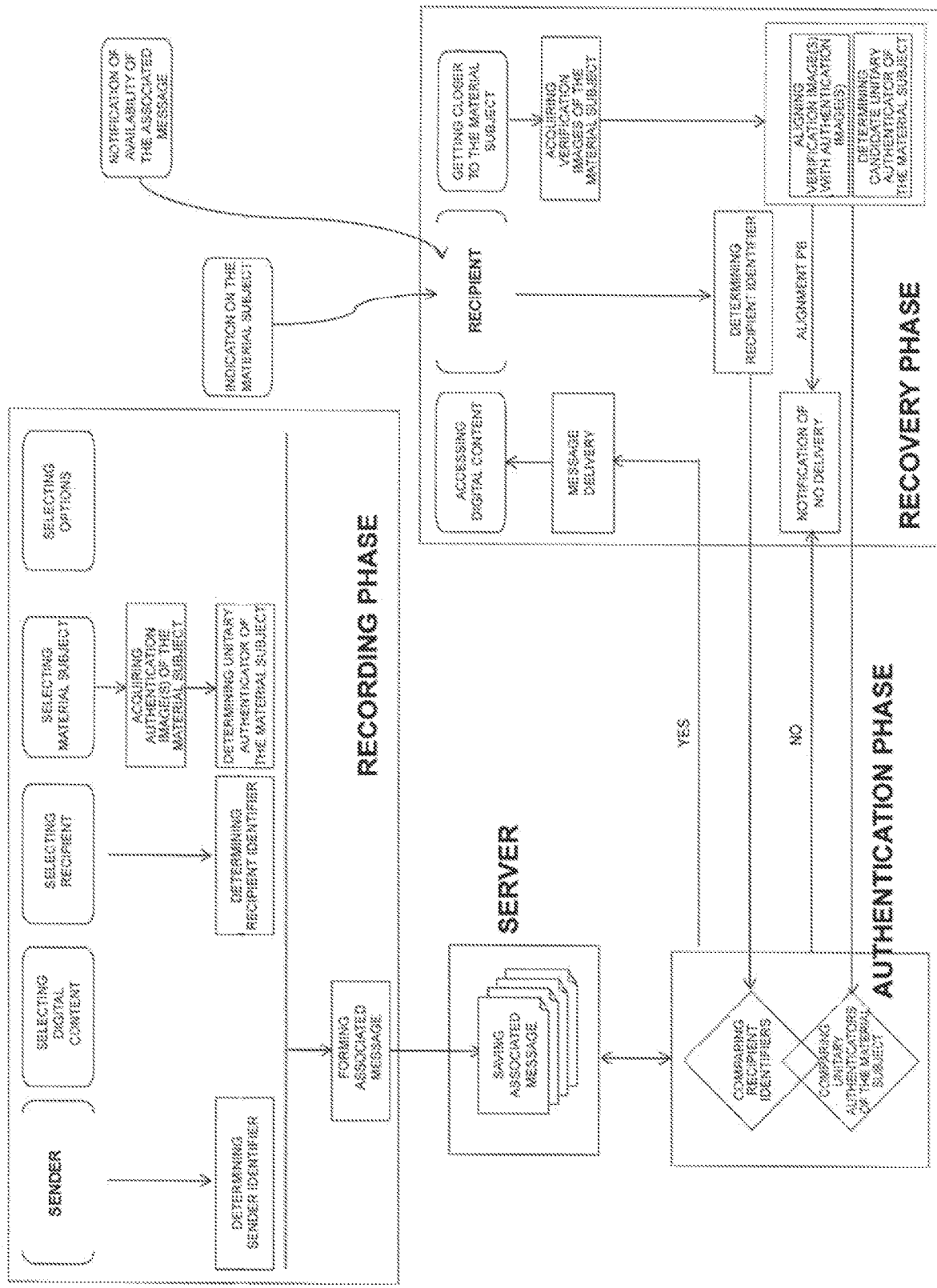

METHOD FOR DIGITAL MESSAGING ASSOCIATING A MESSAGE WITH A MATERIAL SUBJECT

The present invention belongs to the technical field of digital messaging, whatever the content transported (encrypted or not) or the sender(s)/recipient(s) scheme retained (anonymous, 1:1 or 1:N, or even N:1), and for messages having a limited or unlimited time availability (ephemeral or sustainable). By digital messaging, it is meant a technical system (computer, application, network, . . . ) for routing a message and its digital content from a sender to a recipient.

BACKGROUND OF THE INVENTION

The current digital messaging systems allow a sender to send a digital content to one or more recipients. This content travels digitally from the sender to the recipient(s) by remaining in digital form. The content may sometimes have a limited lifetime, i.e. be associated with an integrated or external erasing system. The content may also be encrypted, generally previously requiring the exchange of encryption keys between the sender and the recipient. The content, even encrypted, is routed without particular condition from the sender to the recipient, which may access the content from the moment that the latter has travelled from a server to another one and has reached its saving or archiving destination. All the current systems are based on a unique identifier to define a sender or a recipient. Hence, a content leaving a sender is always recovered by the recipient, or at least the owner of the destination identifier. Initiatives have been taken in the field to refine the conditions of delivery of a message, for example on the condition of being in a certain geographical location (generally defined by GPS, Wi-H, radio or acoustic triangulation, or other) or near another user belonging to a group of users; these applications are called "location-based messaging".

Hence, the systems proposed do not allow the sharing of a digital content between a sender and a recipient strictly conditioned by the implementation of one or more material subjects. The existing methods do not allow attaching a digital content to a material subject. The invention hence aims at remedying this lack by proposing to condition the delivery of a message to the condition that the recipient has been at one moment or another in relation with a material subject or an image of the latter. This way to proceed allows simply improving the confidentiality of the messages without necessarily using cryptography. Moreover, it is known in psychology that human has always used his particular relation with material object to remember particular moments, to signify or ritualize certain events or to share emotions. The word "souvenir" that characterizes the object brought back from a journey or offered to close friends, or also linked to a monument, is a testimony of this connivance between personal or collective memory and the material subjects that surround us. This is hence a secure messaging method that, according to the material subjects chosen, also provides an additional dimension of evocation.

SUMMARY OF THE INVENTION

Hence, the present invention has first for object to transmit a content from one or more sender(s) to one or more recipient(s) by conditioning the delivery thereof to at least one dual authentication i.e., on the one hand, the authentication of the recipient, and on the other hand, the authentication of a material subject that serves as a key to the delivery of the message and that has been used for the preparation thereof. This is hence a method of digital messaging associated with this material subject.

The matter is, figuratively, to place digital Post-it™ on any type of material (physical) object and to create a very interesting experience for the recipient(s), or even also for the sender(s). This virtualization of the attached content has also for advantage to avoid a real or virtual visual pollution, because it is settable and between two worlds.

In order to achieve this object, the invention relates to an electronic message transmission method comprising the following steps:
  initially, choice by a sender of at least one material subject having at least one authentication area showing a microstructure at a given observation magnification, then acquisition or implementation of at least one first image of the authentication area,
  recording, by the sender, of the electronic message to be transmitted on a server system,
  recording on the server system of at least one identifier of at least one recipient of the message, each identifier being associated with the message to be transmitted,
  notification to each recipient of the existence of a message,
  acquisition of at least one second image of the authentication area of the material subject, the second image being acquired with a quality substantially equivalent to that of the first image so that the first and the second images contain a substantially equivalent level of information relating to the authentication area,
  alignment of the first and second images with respect to each other or with respect to a same reference and, jointly or not with the alignment, determination from the first image of a first unitary authenticator of the material subject, and determination from the second image of a second unitary authenticator of the material subject,
  comparison of the unitary authenticators,
  transmission to the server system of an identifier of at least one recipient associated with the second unitary authenticator,
  in case of similarity between the first and second unitary authenticators and matching between the recipient identifier recorded in the server system and the transmitted recipient identifier, transmission to the recipient of the message associated with its identifier and with the unitary authenticator.

The invention has hence for advantage to guarantee that the recipient(s) has(have) been in possession or in presence of the material subject before the delivery of the message, and hence to simply secure the exchange.

In the sense of the invention, the notion of message transmission means equivalently a transmission in "push" mode or a recovery in "pull" mode. Likewise, in the sense of the invention, the phrase "determining a unitary authenticator" is synonymous of the phrase "extracting a unitary authenticator".

It is to be noted that each authenticator may in particular be consisted of the corresponding image without this is however necessarily the case.

By "message", it is meant a digital set comprising at least content as well as information about a sender and a recipient, or even metadata of other natures (timestamp, geolocation, . . . ).

In the sense of the invention, it is to be understood by "server system" a computer system that comprises one or more servers not necessarily located at a same place and that is adapted to implement the invention. Hence, within the framework of this server system, the machine that perform the transmission of the messages is not necessarily that which performs the authentication operations, nor that which operates the saving of the data, it being understood that the server system can also comprise a single machine that performs all the operations allocated within the framework of the invention. In the case of a distributed-architecture server system, the servers implemented are commonly called "nodes".

The invention also relates to an electronic message transmission method comprising the following steps:
  recording of the electronic message to be transmitted on a server system,
  implementation of at least two material subjects each having at least one authentication area showing a microstructure at a given observation magnification,
  implementation of an alignment reference,
  acquisition of at least one first image of the authentication area of each material subject, and alignment of each first image with respect to the alignment reference and, jointly or not with the alignment, determination from each first image of a first unitary authenticator of each material subject,
  recording on the server system of the first authenticator of each material subject, said authenticator comprising an image of the authentication area and/or an authenticator derived from this image,
  acquisition of at least one second image of the authentication area of at least one candidate material subject, the second image being acquired with a quality substantially equivalent to that of the first image so that the first and the second image contain a substantially equivalent level of information relating to the authentication area,
  alignment of the second image with respect to the alignment reference and, jointly or not with the alignment, determination from the second image of a candidate unitary authenticator of the candidate materiel subject,
  transmission to the server of a recipient identifier associated with the candidate authenticator,
  comparison of the candidate unitary authenticator with the first unitary authenticators recorded in the server system and, in case of similarity between the candidate unitary authenticator and a first unitary authenticator, transmission of the message to the recipient whose identifier is associated with the candidate unitary authenticator.

In the sense of the invention, by "alignment reference", it is to be understood a reference image that may be of any nature, such as, for example: an image of a reference subject of the same family, type or category as the material subjects implemented, an image of remarkable points near the authentication area, an image of a pattern or sign present in or near each authentication area, without this list is limitative.

According to a feature of the invention, the message transmission method comprises a step of recording at least one identifier of a recipient associated with at least one unitary authenticator of a material subject.

According to a feature of the invention, it is proceeded to the determination, in each authentication area image of a material subject, of singular points and descriptors of a singular area associated with each singular point, the descriptors being associated with each corresponding singular point, and to the determination, from said image, of a unitary authenticator of said material subject.

Moreover, according to the invention, the different steps are not necessarily performed in the sequential order in which they are enumerated.

Hence, for example and according to a variant embodiment, in a phase of message recording, it is proceeded at least to the following steps:
  recording of the content of the electronic message to be transmitted on the server system, the content being associated with the message to be transmitted,
  recording on the server system of at least one identifier of at least one recipient of the message, each identifier being associated with the message to be transmitted,
  recording on the server system of at least one identifier of at least one sender of the message, each identifier being associated with the message to be transmitted,
  implementation of at least one material subject having at least one authentication area showing a microstructure at a given observation magnification,
  acquisition by a device accessible to the sender of at least one first image of an authentication area,
  determination, from the first image, of at at least one first unitary authenticator of a material subject,
  recording of a unitary authenticator of the material subject on the server system in association with the message to be transmitted.

In a phase of message recovery by each recipient, it is proceeded to at least the following steps:
  acquisition by a device accessible to the recipient of at least one second image of an authentication area of a material subject,
  determination, in the second image, of singular points and descriptors of a singular area associated with each singular point, the descriptors being associated with each corresponding singular point,
  extraction, from the second image, of a second candidate unitary authenticator of the material subject,
  implementation of an alignment by means of the singular points and their associated descriptors, then comparison of the first and second images and/or of their respective unitary authenticators,
  implementation of a phase of authentication of the recipient identifier on the one hand and of the candidate unitary authenticator of the material subject with those associated with the message to be delivered and stored in the server system,
  in case of sufficient similarity between the first and second images or their respective unitary authenticators and matching between the recipient identifier recorded in the server system and the identifier of the candidate recipient, transmission to the recipient of the message associated with its identifier and with the generator material subject.

The step of determination in the first image of singular points and descriptors may then occur either in the recording phase or in the recovery phase or out of these phases.

In the sense of the invention, the micro-texture of the authentication area is intrinsic and random in that it results from the nature itself of the authentication area of the material subject. In a preferred embodiment of the invention, each material subject used belong to the subject families comprising at least one authentication area having an essentially random intrinsic structure that is not easily reproducible, i.e. whose reproduction is difficult or even impossible in that it results notably from a non-predictable process at the observation scale. Such an authentication area with an essentially random and non-easily reproducible continuous medium structure corresponds to the "Physical Unclonable Functions" (PUFs) as defined in particular by the English-language publication Encyclopedia of Cryptography and Security, Edition January 2011, pages 929 to 934, in the article of Jorge Guajardo. Preferably, the authentication area of a material subject according to the invention corresponds to an intrinsic physical unclonable function, called "Intrinsic PUF" in the above-mentioned article. The inventors take advantage of the fact that the random nature of the microstructure of the authentication area is inherent or intrinsic to the nature itself of the subject because resulting from its mode of elaboration, development or growth so that it is not necessary to add to the authentication area a particular structure, in particular a printing, or an engraving.

However, if the microstructure itself of a material subject may be used to determine a unitary authenticator, it may also be used, but also for example the marks leaved by the interaction of an engraving, a printing, an embossing, a stamping with the material subject in its random character (for example: paper with inkjet printing, wherein the shape of the drops deposited on the paper may be sufficient).

According to a feature of the invention, in the message recording phase, at least one identifier of each recipient in the message to be transmitted is recorded on the server system and, in the recovery phase, an identifier of the recipient is implemented jointly with the authenticator of the candidate material subject and the message is then transmitted to the recipient only in case of positive authentication of these latter by the server system or any other device. In the sense of the invention, an identifier is a data or a set of data that allow identifying a recipient or a sender while offering a relatively high degree of certainty that the identity of the latter has not been usurped. Hence, an identifier may be, for example, a biometric data or the combination of a username with a password known by the only person that holds the identifier.

The unitary authenticator may be the acquired image(s) itself (themselves), an image extracted or derived from it (them), or any set of digital data deduced from the acquired image(s) and characterizing this (these) latter. For example, local invariant descriptors of the local features computed from the acquired image(s) that contains (contain) the structural or micro-structural spatial information of the authentication area.

According to another feature of the invention, previously to the message recovery phase, information relating to the material subject whose image of the authentication zone will have to be used for the recovery of the message is transmitted to each recipient. In the sense of the invention, the information relating to the material subject may be location information, position information, or information such as instructions allowing the recipient to know what it has to do to be in presence of the material subject.

According to a variant of this feature, the information relating to the material subject comprises at least one piece of information for geolocating the material subject.

According to another feature of the invention, previously to the message recovery phase, the material subject is delivered to each recipient.

According to another feature of the invention, the recipient is notified by a device of the availability of a message for it, or by any other means. Such a device may then either receive, in so-called "push" mode, a message informing it of the availability of a message to be recovered, or regularly check, in a so-called "pull" mode, the potential availability of a message to be recovered. The notification may also be a contextual display within a framework of an augmented reality visualization.

According to still another feature of the invention, in the message recovery phase, the message is visualized by each recipient in association with an image of the material subject and/or the environment thereof. It is then possible to use for that purpose any type of augmented reality techniques.

According to a feature of the invention, in the recording phase, the determination of a unitary authenticator of a material subject is performed by means of a given algorithm and, during the recovery phase, a mobile communication device is implemented, which comprises image acquisition means and computation means and which is adapted to implement the same algorithm for determining the second unitary authenticator, the candidate unitary authenticator of a material subject.

According to a feature of the invention, in the recording phase, the unitary authenticator of a material subject is an authentication image and, during the recovery phase, a mobile communication device is implemented, which comprises image acquisition means and computation means and which is adapted to implement a given algorithm for the alignment or even for the comparison of the authentication image and of the verification image.

According to a feature of the invention, in the recording phase, the unitary authenticator of a material subject is an authentication image and, during the recovery phase, a mobile communication device is implemented, which comprises image acquisition means and computation means and which is adapted to transmit to a server system the verification image, in a secure manner or not, without making locally the alignment or comparison computations.

According to a feature of the invention, the phases of alignment, determination of a unitary authenticator and comparison are performed partly in a mobile communication device that comprises image acquisition means and computation means and partly in at least one server system.

Of course, the various features and variants of the invention may be associated with each other according to various combinations, in so far as they are not exclusive from each other.

It appears that the invention proposes in particular a messaging system that allows a sender (designated by an identifier) to send a digital content to one or more recipients (designated by one or more identifiers), the content being associated with at least one material subject (each designated by at least one unitary authenticator).

BRIEF DESCRIPTION OF THE DRAWING

A block diagram of an example of such a messaging system is illustrated in FIG. 1.

DETAILED DESCRIPTION OF THE PREFERRED EMBODIMENTS

Hence, to send a message, the sender implements the creation of at least one unitary authenticator of the material subject, which is discriminating and an intrinsic feature of a material subject, that serves as an anchoring to the content to be transmitted. To be able to access the message content, the recipient must provide the server with its identifier, as for any current messaging system, but also a unitary authenticator of the same material subject that has served at the time of creation of the message by the sender. A unitary authenticator of the material subject may be one or more image(s) of the authentication area of the material subject or any metric extracted from said image(s) and partly characterizing the microstructure of the material subject. In the sense of the invention, the content of the message may be of any nature as, for example, data and/or an application or a session starting link, a hypertext link, without this list is exhaustive or limitative.

In the sense of the invention, by "image" it is first meant an optical image whose acquisition chain comprises an optical portion and that results from the stimulation of at least one area of a material subject (called the authentication area) by a light beam, preferably but not necessarily visible by the human visual system. The lighting of the material subject may be adapted to the optical behaviour of the authentication area in reflection and/or in transmission. The ambient lighting may also be used when suitable. The word "image" must also be understood in the wide sense and not limited to the single sense of an optical image resulting notably from the stimulation of an authentication area by a light beam. Hence, the authentication and verification images may be obtained by any type of stimulation of the authentication area in association with a suitable acquisition chain (shift from analog to digital), it being understood that the same type or the same nature of stimulation is implemented for the acquisition of the authentication and verification images. Among the conceivable types of stimulation or acquisition modes, it may be mentioned in particular: ultrasounds, X-rays, X-ray or laser tomography, X-ray radiography, magnetic resonance, without this list is limitative or exhaustive.

According to an exemplary embodiment of the invention, a sender selects, in a recording phase, a digital content, a recipient and at least one material subject. Using an electronic device connected to a computer network, this sender will initiate the implementation of the following steps:

at least determining the sender identifier, determining the recipient identifier and determining a unitary authenticator of the material subject;

forming the associated message: the whole previously mentioned digital data (sender identifier, recipient identifier, digital content and unitary authenticator of the subject material) will be assembled to form an associated message, a set of multi-unitarily-indexed digital data, ready to be handled in any existing telecommunication infrastructure and according to all the known or adapted protocol types (e-mail protocol, instantaneous messaging protocol, messaging protocols (WAP, SMS, MMS, . . . ), . . . ).

The associated message is then handled by the selected telecommunication infrastructure and will be at least saved in a digital container (local or remote server system), so that it can subsequently be implemented (delivered).

The recipient is then directly or indirectly notified by the server system or any other device of the availability of the associated message and receives an indication about the material subject (and/or the authentication area of the material subject) having been initially associated with the message so that it can get closer to the material message and implement the recovery part of the method, object of the invention.

A step of determining an identifier of the recipient and a phase of determining a candidate unitary authenticator of the material subject (verification unitary authenticator) are then implemented. To be allowed to access the content of the associated message, a same material subject as that implemented during the generation of the message, or substantially the same authentication area of the same material subject as that initially implemented by the sender, must be used. This phase of determining a candidate unitary authenticator comprises the following steps: acquiring at least one verification image (image acquired from an authentication area of the candidate material subject)/performing a relative or absolute alignment of the authentication and verification images and determining a unitary authenticator of the candidate material subject/in the case where the alignment is not possible, concluding in the premature failure of the authentication of the images of the material subjects.

An authentication phase is then implemented locally (in the device of or close to the recipient) or remotely (in at least one server system), or partly locally and partly remotely. This operation is executed by one or more electronic devices provided with at least one processor and one memory, or even with telecommunication means, for performing the sequences of digital computation and comparison between the saved recipient identifier and the recipient candidate identifier on the one hand, and, on the other hand, the unitary authenticators of the candidate material subject and of the material subject saved during the message recording phase. This step will require the interaction with at least one server system.

In case of invalidation of the authentication phase (NO), the method ends by a notification of the delivery failure at least to the recipient and may, as the case may be, propose the recipient to start again from the beginning of the recovery phase.

In case of validation of the authentication phase (YES), the following step is the delivery of the associated message with the possibility for the recipient to access the digital content as wanted by the sender.

In the sense of the invention and according to the simplest embodiment, the sender and recipient identifiers are respectively consisted of the pre-existing usernames and passwords, whereas the unitary authenticator of the material subject is reduced to an image acquired by means of an electronic communicating device equipped with at least one sensor (possibly its own stimulation source) containing at least physical features intrinsic to the material subject.

In the sense of the invention, the sender may be any entity (person or automaton or robot or communicating object) denoted as being the sender of the content of a message. It may be anonymous, without this is necessary.

In the sense of the invention, the recipient may be any entity (person or automaton or robot or communicating object) denoted as the recipient of the content of a message. The recipient may be unique, multiple and restricted, i.e. reserved for a predefined group, or not-restricted, i.e. accessible to anybody while having an access controlled by the necessity of implementing the material subject or the possibility to recompute the unitary authenticator of the authentical material subject. A unitary authenticator of the material subject may be an image of the authentication zone of the material subject or any metric extracted from said image and partly characterizing the microstructure of the material subject.

In the sense of the invention, the material subject is preferably independent of the sender and of the recipient. The invention is based in part on the properties of unicity, non-reproducibility and unpredictability of the material subject. According to the invention, the material subject is not a living animal and is preferably inert or dead as opposed to alive, i.e. the material subject is not liable to be spontaneously modified within the framework of a living organism growth or regeneration process. The invention uses or implements the microstructure or structure of the material subject, translated into a microtexture or texture in any image acquired from said material subject. The material subject may be a physical object (material, product, . . . ) or a natural scene (landscape, . . . ) whose nature and complexity are compatible with the features necessary to the implementation of the invention.

In the sense of the invention, it may be understood by authentication area a portion of a material subject whose extracted image contains spatial information, about the structure or microstructure of the material subject (for example, inhomogeneities naturally present). Within the framework of the invention, at a given observation magnification, the word texture or microtexture relates to what is visible or observable on an image, whereas the word structure or microstructure relates to the material subject itself. Hence, at a given observation magnification, a texture or microtexture corresponds to an image of the structure or microstructure of the authentication area of a material subject.

An authentication area is hence a physical space on or in the material subject, which has allowed generating during the recording phase a unitary authenticator from the material subject and which must be reused at least during the recovery phase to allow the recovery of a message. An authentication area has not required to be physically marked in the sense of the invention. The position of the authentication area on the material subject to be authenticated may be recorded. Such a recording allows, although it is not absolutely necessary, facilitating the verification phase. A material subject used in the implementation of the method object of the present invention having no marking hence cannot be known nor detected by anyone that is not the sender or the recipient of the associated message. For example, telemetric, location (GPS or other), gyroscopic (accelerometer(s) integrated in a mobile terminal, for example) data can be used to guide the recipient during the recovery phase, for it to be in conditions the closest possible from those initially used by the sender.

Of course, a material subject can also be implemented, on which a reading zone used will have been located or even marked. Hence, according to still another feature of the invention, the position of the authentication area on the subject to be authenticated is marked on the subject to be authenticated. This marking may be explicit in that there are one or more marks indicating the authentication area or implicit in that the authentication area is located in or near a characteristic area of the subject, for example near a decorative pattern.

At least one authentication image (first image acquired from an authentication area of a material subject) is implemented during the formation of the message by the sender(s) and at least one verification image (second image acquired from an authentication area of a candidate material subject) must be implemented by the recipient(s) to allow access to the content of the message in the only case in which the candidate material subject is a material subject having been used during the formation of the associated message. The formation of the message may also occur during the so-called recording phase or during the so-called authentication phase. Preferably, the authentication image of the material subject and/or the material subject is in possession or in presence of the sender, which may also be qualified as the author or creator, before the recipient is in possession or in presence of the material subject. In other word, the material subject is known from the sender before being known from the recipient. Hence, according to an embodiment of the invention, the sender prepares the message associated with the material subject it will have chosen without previously knowing the recipient, in other words, without previous identification of the recipient.

The invention, by performing an analysis of similarity between a first image, which is called authentication image, and a second image, which is called verification image or candidate image, has for advantage to allow the delivery of the message content to the recipient whereas the conditions of material subject imaging for taking the verification image or second image are never identical to those met when the sender took the first image or authentication image. Indeed, between the acquisitions of the first and second images, the material subject may have been slightly degraded, the conditions of illumination or other stimulation are not the same, the sensor used is generally different (ex: optical system and resolution) and the relative positions of the sensor, the stimulation source and the material object are also different.

In order to respond to the difficulties generated by the difference of conditions of acquisition of the first and second images, the invention proposes in a preferred embodiment to proceed to an alignment of the two images or to an alignment of one of the images with respect to the other. By alignment, it is meant the matching of images (mono or multi-sources), i.e. the identification of different attributes subject to a certain relation. This matching is generally based on the search for a possible geometric transformation allowing the passage from one image to the other, directly or with respect to at least one reference image. For that purpose, the main known methods are the search for common (matched) geometric primitives between the two images for computing the transformation or the search for similarity (correlation or other) between local intensity features in the two images for computing the transformation. The searched transformation in the sense of the invention may be linear (so-called rigid transformation, for example homography) but also non-linear (deformable transformation). Hence, it is possible to apply the method object of the present invention to solid material subjects but also to totally or partly elastic material subjects, or even material subjects having hybrid features.

In the sense of the invention, the alignment of the verification image (second image) and the authentication image (first image) must be understood between image(s) and image(s), between portion(s) of mage(s) and portion(s) of image(s), or even between a set of singular points and their local features and another set of singular points and their local features, between couples (singular points, local descriptors) and couples (singular points, local descriptors), or between any derived pieces of information allowing a matching and, as the case may be, a computation of geometric transformation. In the previous example, the mentioned couples are considered as unitary authenticators of the material subject.

The alignment implemented is a prerequisite to the comparison itself of the images or of the unitary authenticators associated with said images. For that purpose, many metrics can be contemplated without altering the present invention. It may be mentioned the computation of signatures extracted from the first and second images according to a same algorithm and the consecutive computation of a distance between these metrics and the use of an acceptation threshold, or the direct comparison of corresponding singular points in the first image and in the second image with an acceptation threshold as regards the number of matchings of singular points, for example. These singular points may advantageously be invariants or almost-invariants to the linear or affine transformations (rotation, homotheties, translation and scale factor).

Likewise, a distance, the inverse of a distance or a suitable divergence may be used as an indicator of similarity, and may also be applied for matching the characteristic points of interest detected and quantified by means of local descriptors between image tiles, coming for example from Law filters or local binary patterns (LBPs) or signal level gradient (for example, of the SURF, SIFT, KAZE, ORB, BRISK type, ... ). For these latter processes, in particular, it may be pertinent to implement a previous filtering step so as to erase the differences of local illumination and/or a histogram equalization and hence to reveal the interest of the microstructure/microtexture of the image in the sense of the invention.

Within the framework of the invention, computational methods using artificial neural networks, which implicitly align, compute similarity weights, extract features and/or classify, may also be used. Hence, in an embodiment of the invention, a dense alignment, i.e. based on a high number of points or correspondence zones, allows the recognition and hence also the authentication of the material subject.

A unitary authenticator of a material subject may be digital information deduced from the properties of unicity, unpredictability or even non-reproducibility of said material subject and that ensures that any generation of a candidate unitary authenticator from a same material subject will be located at a distance lower than a certain threshold whereas any generation of a unitary authenticator coming from another material subject will be located at a distance higher than this same threshold, said threshold being chosen so as to maximally reduce the risks of collision (acceptance of a false for a true and rejection of a true for a false). Then, a statistical comparison with similarity indicator and acceptance threshold is for example implemented.

A unitary authenticator of a material subject may be a set (multidimensional) whose boundary is determined so that any candidate unitary authenticator coming from the same material subject (same authentication area) is an element of this set in the sense of membership criterion, and that any candidate unitary authenticator coming from another material subject is not an element of this set, while maximally reducing the risks of collision (acceptance of a false for a true and rejection of a true for a false). The so-formed universe of unitary authenticators may be settable a priori or changeable a posteriori.

Within the framework of the invention, the fact that any material subject is liable to be subject over time to voluntary or involuntary changes and that any acquisition capture of an image of the material subject also induces variability is taken into account. Advantageously, the method according to the invention is resistant to the partial alterations of the subject to be authenticated and robust as regards the variations of the conditions of acquisition of the authentication and verification images. The method object of the present invention is resistant to material alterations of the subject or to changes in the conditions of acquisition of small amplitude, this notion of small amplitude being conditioned by the choice of the similarity index and of the acceptance threshold or of the membership criterion and of the boundary. However, the method according to the invention cannot be implemented in case of too important changes or alterations at the scale of the authentication area or of too dissimilar conditions of capture for the first and second images.

The choice of a material subject itself is a determining element of the robustness of the whole method. It may be interesting in certain applications to use material subjects that degrade/evolve more or less rapidly over time so as to naturally limit the duration of availability of the messages to the lifetime or duration of recovery of a unitary authenticator of the correct material subject in the sense of the invention.

It may even be contemplated to characterize the degradation index of the material subject to estimate its age as an element for dating of determining the "age" of the message.

It must be noted that the invention offers a certain reliability and safety of the messages and of their delivery thanks to their association with material subjects, even if it does not aim specifically at being a secure method of message transmission. To reinforce the safety of the method according to the invention, it is possible to implement any mechanism for securing data and electronic equipment/ devices, for example data encryption, electronic signatures, safety token. Likewise, the safety may be ensured by a distributed and secure register system, of the "blockchain" type, of all the messaging transactions performed from the first implementation or starting of a messaging system according to the invention. The secured element within the framework of such a mechanism might then be the exchanged message or the material subject(s) implemented or their image or also the combination of the message and of the associated material subject(s).

Moreover, it is possible that the content of the message as implemented in the present method by a sender can continue to evolve in its storage phase and that, until its delivery to the recipient. Hence, the sender may decide of the precise and definitive information forming the content of the associated message but may also chose the rules of evolution and starting information (initial content) that will evolve at least until the delivery thereof. For example, a content, fully or partly of the RSS feed type, updated during the saving (the saving into the data server is herein dynamic); or a content, fully or partly dependent on the day of delivery, is perfectly possible (day that is not known from the sender when it anchors its message).

In a variant of the method according to the invention, it is offered to the recipient the possibility to repost a message fully or partly different from the associated message and to send it back to the initial sender.

Likewise, the notification to the recipient(s) may be made by specifying a unique identification number of the message (for example, constructed from a random value coupled to an incremental value) serving back as an index and allowing a faster 1:1 control, during the recovery and authentication phase(s).

According to a variant implementation, a sender may send to a recipient an indication about the material subject by any channel, including, even if possibly less relevant, via the server system (in an encrypted manner or not, in the same time as the notification). A mode of communication of the indication as for the material subject may be, for example, by SMS or MMS or phone, when the associated message is transmitted by e-mail, for example.

The invention may be implemented with suitable electronic devices comprising at least one sensor (camera, CCD sensor, CMOS, ultrasounds, ... ), a memory and a processor, or even, as the case may be, a stimulation source (luminous or other). Among the electronic devices adapted to the implementation of the invention, it may be mentioned: computer, tablet, smartphone, augmented reality mask, augmented reality glasses.

It must be noted that it is possible to chose as a material subject a manufactured product (industrial or traditional), a work of art, an element or a natural scene. In the case of a perfume box, for example, and at the time of purchase in the shop, the method can be implemented as a sender, and said perfume box can be sent to a recipient. After delivery, the recipient is hence in possession of the material subject, the link is hence established, it has been notified by any means by the sender that a message is waiting for it (possibly with a unique identification number of the message) and it may then implement the method and receive the digital content provided for by the sender.

It is also possible to chose as a material subject an urban environment, a stone of a famous monument (Notre Dame Cathedral in Paris, Coliseum in Rome, . . . ), and implement the method object of the invention.

Among the conceivable applications for the invention, it may be mentioned interactions and exchanges between a product manufacturer/distributor and the consumers, track games whose clues and/or instructions are delivered by means of the messaging system according to the invention. Another possible application is the recording of products for guarantee, or access or delivery to instructions for use.

Of course, various other variants of the method or other embodiments of the invention may be contemplated within the framework of the appended claims.

The invention claimed is:

1. A method of transmission of an electronic message by a sender to one or more recipients, the method comprising:
   an initial step of choosing, by a sender, at least one material subject having at least one authentication area showing a microstructure at a given observation magnification, each material subject being independent of the sender and the one or more recipients, followed by acquisition or implementation of at least one first image of the authentication area;
   recording, by the sender, the electronic message to be transmitted on a server system;
   implementing at least one identifier of at least one of said one or more recipients of the message, each identifier being associated with the message to be transmitted;
   notifying each one of said one or more recipients of an existence of a message;
   transmitting to each of said one or more recipients of information relating to the material subject whose image of the authentication zone will have to be used for recovery of the message;
   acquisition by each of said one or more recipients of at least one second image of the authentication area of the material subject, the second image being acquired with a quality substantially equivalent to that of the first image so that the first and the second images contain a substantially equivalent level of information relating to the authentication area;
   determining from the first image of a first unitary authenticator of the material subject;
   determining from the second image of a second unitary authenticator of the material subject;
   comparing the unitary authenticators;
   transmitting, to the server system, an identifier of each recipient that proceeded to the acquisition of the second image used to determine the second unitary authenticator, the identifier of said each recipient being associated to the second unitary authenticator; and
   upon there being a similarity between the first and second unitary authenticators and a matching between the implemented recipient identifier and the transmitted recipient identifier, transmitting to the recipient the message associated with the identifier associated with the message and with the unitary authenticator.

2. The method according to claim 1, wherein the unitary authenticator of each material subject is the image of its authentication area.

3. The message transmission method according to claim 1, further comprising:
   recording at least one identifier of a recipient associated with at least one unitary authenticator of a material subject.

4. The method according to claim 1, further comprising:
   determining, in each authentication area image of a material subject, singular points and descriptors of a singular area associated with each singular point, the descriptors being associated with each corresponding singular point, and determination, from said image, of a unitary authenticator of said material subject.

5. The method according to claim 1, wherein the information relating to the material subject comprises at least one piece of information chosen from the following:
   information for geolocating the material subject; and
   indication on the authentication zone of the material subject.

6. The method according to claim 1, wherein, the message is visualized by each recipient in association with at least one image of the material subject and an environment thereof.

7. The method according to claim 1,
   wherein the determination of a unitary authenticator of a material subject is performed by means of a given algorithm, and
   wherein a mobile communication device is implemented, said mobile communication device comprising image acquisition means and computation means, and which is adapted to implement a same algorithm for determining a second unitary authenticator.

8. The method according to claim 1,
   wherein the unitary authenticator of the material subject is an authentication image, and
   wherein a mobile communication device is implemented, the mobile communication device comprising image acquisition means and computation means, and which is adapted to transmit to a server system the second image without making locally the alignment or comparison computations.

9. The method according to claim 1, further comprising:
   phases of alignment of the images,
   wherein the phases of alignment and determination of a unitary authenticator and comparison are performed partly in a mobile communication device that comprises image acquisition means and computation means, and being partly in at least one server system.

10. The method according to claim 1, wherein each material subject used belongs to subject families comprising at least one authentication area having an essentially random intrinsic structure that is not easily reproducible in that it results from a non-predictable process at the observation scale.

11. The method according to claim 1, wherein, for determining the unitary authenticators, an alignment is conducted during which the first and second images are aligned with respect to each other or with respect to a same reference.

12. The method according to claim 1, wherein, for determining the unitary authenticators, an alignment is conducted during which the first and second images are aligned with respect to each other or with respect to a same reference, said alignment being based on a high number of points or correspondence zones.

13. The method according to claim 1, wherein a distributed and secure register system is implemented, of blockchain type, a secured element within said register system being at least one of the following:

the exchanged message;

the material subject(s) implemented; and an image of the material subject(s) implemented.

14. The method according to claim 1, wherein the message evolves until transmission to each recipient.

15. The method according to claim 1, further comprising: implementing artificial neural networks for determining or comparting the unitary authenticators.

16. The method according to claim 1, wherein, previously to the transmission of the message, the material subject is delivered to each recipient.

17. The method according to claim 1, wherein at least one identifier of each recipient of the message to be transmitted is recorded on the server system, and a recipient identifier is transmitted, the message being transmitted to the recipient only upon positive authentication of the recipient by the server system.

18. The method according to claim 1, further comprising:
a phase of message recording, during which the following steps take place:
   recording of the content the electronic message to be transmitted on the server system, the content being associated with the message to be transmitted;
   recording, on the server system, at least one identifier of at least one recipient of the message, each identifier being associated with the message to be transmitted;
   recording, on the server system, at least one identifier of at least one sender of the message, each identifier being associated with the message to be transmitted;
   implementing of at least one material subject having at least one authentication area showing a microstructure at a given observation magnification;
   acquiring, by a device accessible to the sender, at least one first image of an authentication area;
   determining, in the first image, singular points and descriptors of a singular area associated with each singular point, the descriptors being associated with each corresponding singular point;
   recording the singular points and their associated descriptors; and
   recording a unitary authenticator of the material subject on the server system in association with the message to be transmitted.

19. A method of transmission of an electronic message by a sender to one or more recipients, the method comprising:
   an initial step of choosing, by a sender, at least two material subjects each having at least one authentication area showing a microstructure at a given observation magnification, followed by acquisition or implementation of at least one first image of the authentication area of each material subject;
   recording the electronic message to be transmitted on a server system;
   implementing at least two material subjects each having at least one authentication area showing a microstructure at a given observation magnification;
   implementing an alignment reference;
   aligning each first image with respect to the alignment reference and, jointly or not with the aligning, determining, from each first image, a first unitary authenticator of each material subject, said unitary authenticator comprising an image of the authentication area and/or an authenticator derived from this image;
   recording on the server system the first authenticator of each material subject;
   acquiring at least one second image of the authentication area of at least one candidate material subject, the second image being acquired with a quality substantially equivalent to that of the first image so that the first and the second images contain a substantially equivalent level of information relating to the authentication area;
   aligning the second image with respect to the alignment reference and, jointly or not with the aligning, determining from the second image of a candidate unitary authenticator of the candidate materiel subject;
   transmitting to the server system an identifier of at least one recipient associated with the candidate authenticator;
   comparing the candidate unitary authenticator with the first unitary authenticators recorded in the server system and, upon there being a similarity between the candidate unitary authenticator and a first unitary authenticator, transmitting the message to the recipient whose identifier is associated with the candidate unitary authenticator.

20. The method according to claim 19, further comprising:
   determining, in each authentication area image of a material subject, singular points and descriptors of a singular area associated with each singular point, the descriptors being associated with each corresponding singular point, and determination, from said image, of a unitary authenticator of said material subject.

* * * * *